(12) United States Patent
Mehta et al.

(10) Patent No.: US 9,612,918 B2
(45) Date of Patent: Apr. 4, 2017

(54) METHODS AND SYSTEMS FOR RESTORING STORAGE OBJECTS

(71) Applicant: NETAPP, INC., Sunnyvale, CA (US)

(72) Inventors: Tarun Mehta, Bangalore (IN); Venudhar Poluri, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 347 days.

(21) Appl. No.: 14/517,011

(22) Filed: Oct. 17, 2014

(65) Prior Publication Data

US 2016/0110264 A1    Apr. 21, 2016

(51) Int. Cl.
G06F 17/30    (2006.01)
G06F 11/14    (2006.01)
H04L 29/08    (2006.01)

(52) U.S. Cl.
CPC ...... G06F 11/1464 (2013.01); H04L 67/1097 (2013.01); *G06F 2201/84* (2013.01)

(58) Field of Classification Search
USPC ......................................................... 707/674
See application file for complete search history.

(56) References Cited

U.S. PATENT DOCUMENTS

| 6,489,963 B2* | 12/2002 | Parikh | G06F 12/0875 345/522 |
| 8,364,648 B1* | 1/2013 | Sim-Tang | G06F 17/30368 707/674 |
| 8,463,746 B2* | 6/2013 | Gundy | G06F 17/30088 707/610 |
| 2005/0228942 A1* | 10/2005 | Nichols | G06F 11/004 711/114 |
| 2009/0217271 A1* | 8/2009 | Goto | G06F 11/1464 718/100 |
| 2010/0145909 A1* | 6/2010 | Ngo | G06F 11/1471 707/611 |
| 2010/0179941 A1* | 7/2010 | Agrawal | G06F 11/1451 707/624 |
| 2011/0035547 A1* | 2/2011 | Kidney | G06F 3/061 711/114 |
| 2013/0159648 A1* | 6/2013 | Anglin | G06F 11/1453 711/162 |

* cited by examiner

*Primary Examiner* — Debbie Le
(74) *Attorney, Agent, or Firm* — Klein, O'Neill & Singh, LLP (57) ABSTRACT

Methods and systems for restoring storage objects are provided. The method includes determining if a source storage object and a target storage object are located within a same storage volume, where the source storage object is associated with a first drive and the target storage object is associated with a second drive; and using a point in time copy of the source storage object for restoring the source storage object at the second drive.

21 Claims, 10 Drawing Sheets

METHODS AND SYSTEMS FOR RESTORING STORAGE OBJECTS

TECHNICAL FIELD

The present disclosure relates to storage systems and more particularly, to restore operations.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server") executing a storage operating system configured to store and retrieve data on behalf of one or more client computing systems at one or more storage devices. The storage operating system exports data stored at storage devices as a storage volume. A storage volume is a logical data set which is an abstraction of physical storage, combining one or more physical mass storage devices or parts thereof into a single logical storage object. From the perspective of a client computing system each storage volume can appear to be a single storage device. However, each storage volume can represent storage space in one storage device, an aggregate of some or all of the storage space in multiple storage devices.

Storage volumes are replicated by taking a point in time copy of the data stored at the storage volumes. The point in time copy can be used to restore a storage volume. In conventional systems, a restore operation restores a storage object to a same drive as a source storage object. Continuous efforts are being made to provide flexibility for a restore operation such that a storage object can be restored to different drives than the source drive.

SUMMARY

In one aspect, a method for restoring a storage object is provided. The method includes determining if a source storage object and a target storage object are located within a same storage volume, where the source storage object is associated with a first drive and the target storage object is associated with a second drive; and using a point in time copy of the source storage object for restoring the source storage object at the second drive.

In another aspect, a non-transitory, machine readable storage medium having stored thereon instructions for performing a method is provided. The machine executable code which when executed by at least one machine, causes the machine to: determine if a source storage object and a target storage object are located within a same storage volume, where the source storage object is associated with a first drive and the target storage object is associated with a second drive; and use a point in time copy of the source storage object for restoring the source storage object at the second drive.

In yet another aspect, a system having a memory with machine readable medium comprising machine executable code having stored thereon instructions; and a processor module coupled to the memory are provided. The processor module is configured to execute the machine executable code to: determine if a source storage object and a target storage object are located within a same storage volume, where the source storage object is associated with a first drive and the target storage object is associated with a second drive; and use a point in time copy of the source storage object for restoring the source storage object at the second drive.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

Figure 1:
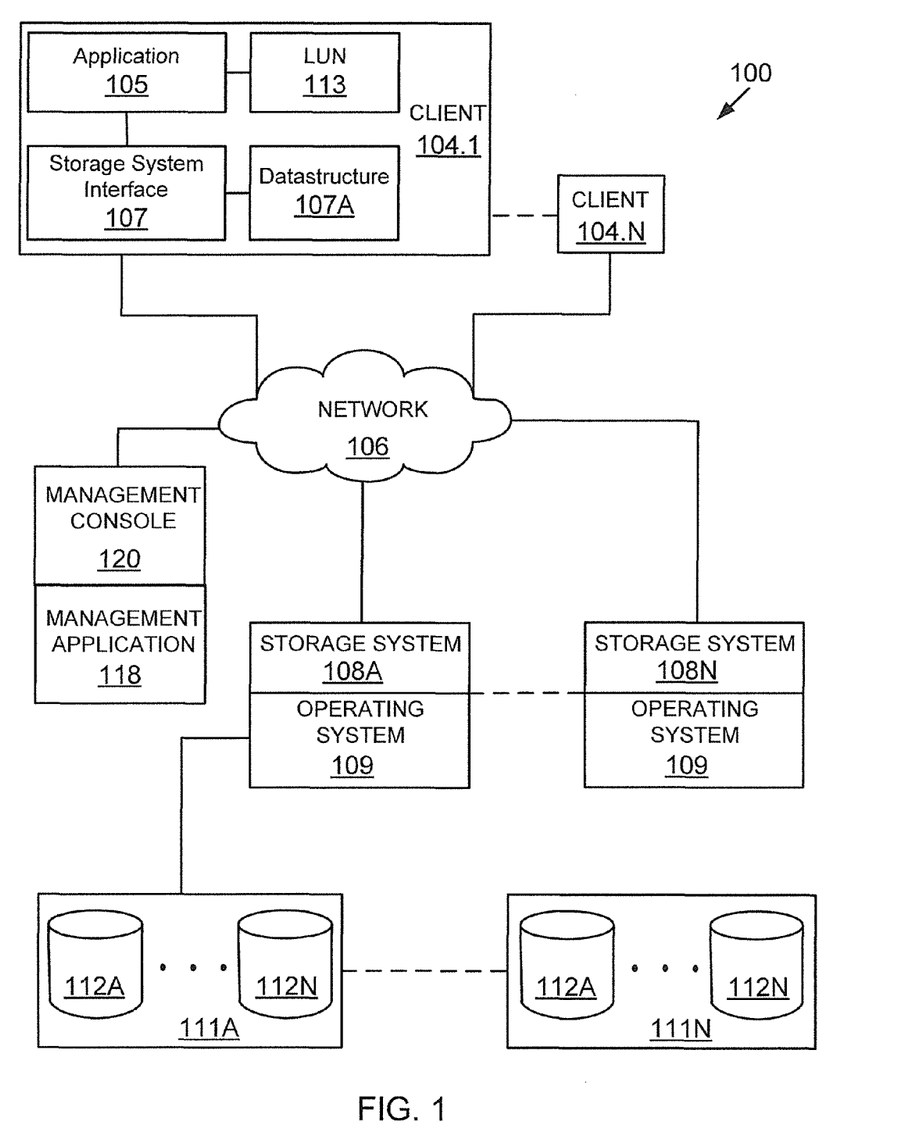
FIG. 1 shows an example of a storage environment using a non-clustered storage system, according to one aspect.

Storage Environment 100:

FIG. 1 depicts a non-cluster based storage environment 100 having a plurality of storage devices and storage systems, used according to one aspect. The storage environment 100 may include a plurality of client systems 104.1-104.N (also referred to as client 104), storage systems 108A-108N (also referred to as storage system 108), a management console 120 and at least one network 106 communicably connecting client systems 104.1-104.N, storage systems 108 and management console 120. Network 106 may a local area network (LAN), wide area network (WAN), the Internet and others. As described herein, the term "communicably connecting" may refer to a direct connection, a network connection, or other connections to enable communication between devices.

Clients' 104.1-104.N as described below in more detail may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Each storage system 108 may include or has access to a storage subsystem 111 (shown as 111A-111N) having multiple mass storage devices 112A-112N (may also be referred to as storage devices 112). The mass storage devices 112 may be, for example, conventional magnetic disks, optical disks such as CD-ROM or DVD based storage, magneto-optical (MO) storage, flash based storage devices or any other type of non-volatile storage devices suitable for storing structured or unstructured data.

Client 104 executes an application 105 for accessing storage space managed by storage system 108. Application 105 may be a database, email or any other application type. Application 105 is presented with one or more logical unit number (LUN) 113 to access storage space that is maintained by storage system 108. A LUN is uniquely identified by a LUN identifier and is typically assigned a size. LUN 113 at client 104 is mounted at an operating system of the client system 104 via a configured drive letter.

Client 104 also executes a storage system interface module (SSIM) 107 for providing storage services, for example, backup, restore and others. An example of SSIM 107 is the SnapDrive® (without derogation of any trademark rights) product provided by NetApp Inc, the assignee of this application. SSIM 107 interfaces with the storage system 108 for providing storage related services. SSIM 107 maintains a mapping data structure 107A used for a restore operation, such that LUN 113 can be restored from a source drive to a target drive, as described below in detail.

The storage system 108 executes a storage operating system 109 for managing storage space within storage subsystem 111 and presenting the storage space to clients 104. As an example, storage operating system 109 may be the DATA ONTAP® storage operating system, available from NetApp®, Inc., that implements a Write Anywhere File Layout (WAFL®) storage system, or any other suitable storage operating system.

Storage operating system 109 and applications running on the client systems 104.1-104.N communicate according to well-known protocols, such as the NFS (Network File System) protocol or the CIFS (Common Internet File System) protocol, to make data stored on storage device 112 appear to users and/or application programs as though the data were stored locally on the client systems 104.1-104.N.

Storage operating system 109 presents or exports data stored at storage devices 112 as a storage volume (may also be referred to as a volume) to client systems 104.1-104.N. In one aspect, a storage volume is a logical data set which is an abstraction of physical storage, combining one or more physical mass storage devices or parts thereof into a single logical storage object. LUN 113 may be a part of the storage volume or may be the entire storage volume.

A storage volume may be configured to store data containers, scripts, word processing documents, executable programs and any other type of structured or unstructured data. The term data container as used herein means a block, a file, a logical unit of data or any other information. Each storage volume can represent storage space in one storage device, an aggregate of some or all of the storage space in multiple storage devices, a RAID (redundant array of inexpensive disks) group, or any other suitable set of storage space.

In a typical mode of operation, one of the client systems 104 transmit one or more I/O (input/output) commands, such as an NFS or CIFS request, over network 106 to the storage system 108. The storage system 108 issues one or more I/O commands to storage device 112 to read or write the data on behalf of the client system. The storage system 108 also issues an NFS or CIFS response containing the requested data over network 106 to the client system.

The various storage devices including storage volumes can be configured and managed by using a management application 118 executed by management console 120. In one aspect, as described below management console 120 may be, for example, a conventional PC, workstation, or the like.

Communication between the management application 118 and storage system 108 may be accomplished using any of the various conventional communication protocols and/or application programming interfaces (APIs), the details of which are not germane to the technique introduced herein. This communication can be enabled by network 106 or via a direct link (not shown).

Figure 2A:
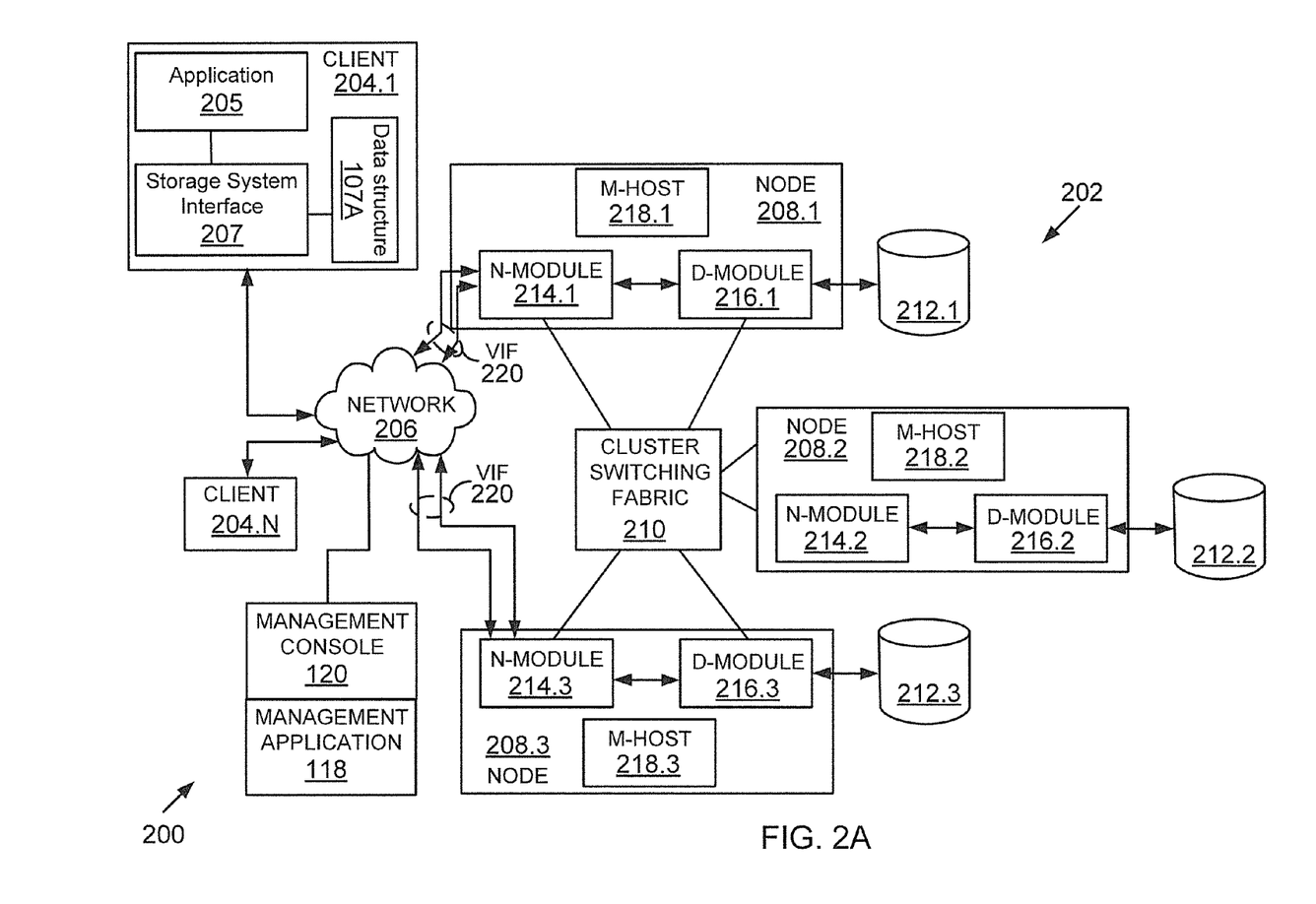
FIG. 2A shows an example of a storage environment using a clustered storage system, according to one aspect.

Clustered System:

FIG. 2A shows a cluster based storage environment 200 having a plurality of nodes, used according to one aspect. Information stored at any of the nodes can be replicated to any drive, using the methods and systems described below in detail.

Storage environment 200 may include a plurality of client systems 204.1-204.N (similar to clients' 104.1-104.N), executing application 105 and SSIM 107, a clustered storage system 202, management console 120 and at least a network 206 communicably connecting the client systems 204.1-204.N and the clustered storage system 202. The clustered storage system 202 includes a plurality of nodes 208.1-208.3, a cluster switching fabric 210, and a plurality of mass storage devices 212.1-212.3 (may be referred to as 212 and similar to storage device 111).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 are used to configure storage volumes and LUNs that are presented to clients 204 for storing information. The M-modules 218.1-218.3 maintain various data structures for storing configuration information regarding storage volumes and LUNs, including LUN name, size, identifier, drives that are used to mount the LUNs and other information.

A switched virtualization layer including a plurality of virtual interfaces (VIFs) 220 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

The client systems 204.1-204.N of FIG. 2A may be implemented as general-purpose computers configured to interact with the respective nodes 208.1-208.3 in accordance with a client/server model of information delivery. In the presently disclosed aspect, the interaction between the client systems 204.1-204.N and the nodes 208.1-208.3 enable the provision of network data storage services.

Specifically, each client system 204.1, 204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.N may issue packets according to file-based access protocols, such as the NFS or CIFS protocol, when accessing information in the form of files and directories.

In conventional systems, information that is stored for a LUN or a volume may be saved as a point in time copy (also called a snapshot (without derogation of any trademark rights of NetApp Inc.). The snapshot or the LUN can be restored for the client, when the client needs it.

Conventional restore processes have shortcomings because a snapshot or a LUN can only be restored to a same drive. This is undesirable in an environment where clients may want to restore LUNs/snapshots to different drives. The various aspects described herein provide a flexible solution where a LUN and/or a snapshot can be restored to any drive, as described below in detail.

Figure 2B:
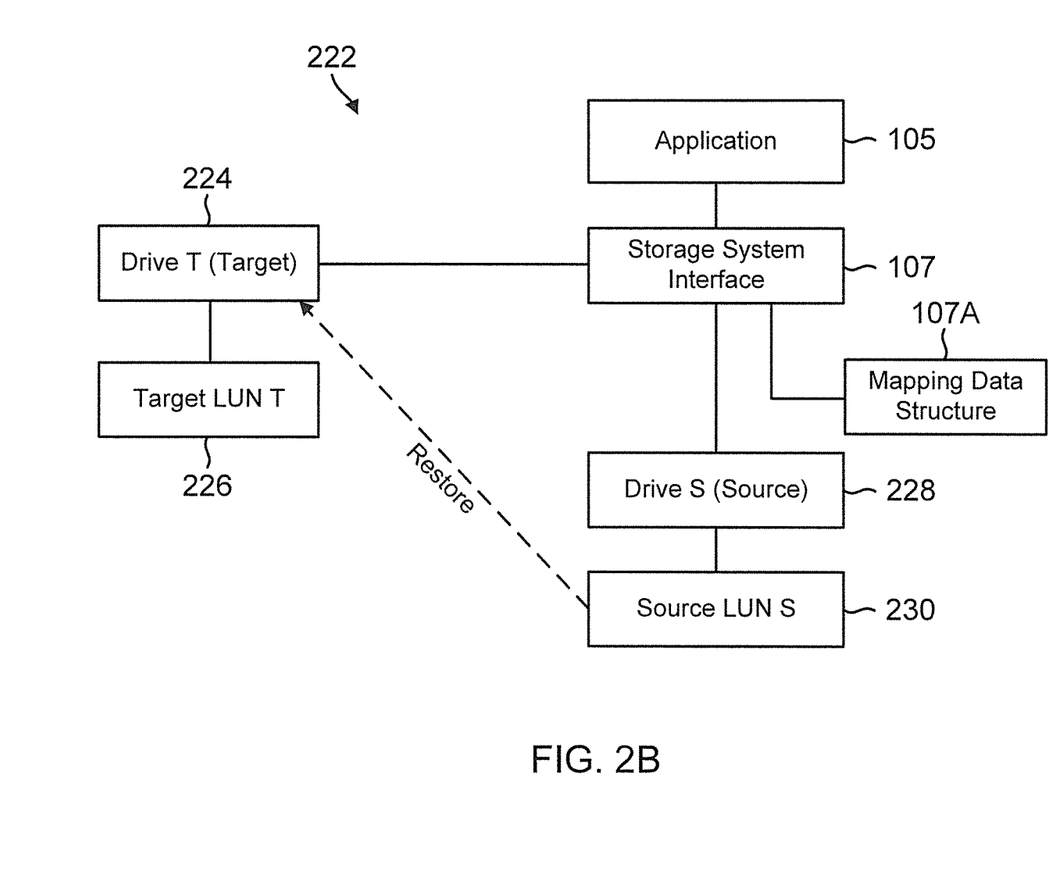
FIG. 2B shows an example of restoring logical storage objects, according to one aspect.

FIG. 2B shows an example of restoring a LUN from a source drive S 228 to a target drive T 224. The source drive 228 is associated with a source LUN 230, while target drive 224 is associated with a target LUN 226. Source LUN 230 and target LUN 226 may be located at a same storage volume managed by a storage system, different storage volumes managed by a same storage system and different storage volumes managed by different storage systems. SSIM 107 uses data structure 107A for mapping the LUNs from the source drive to the target drive. In one aspect, unlike conventional systems, where a LUN is restored to the same drive, a LUN can be restored to any target drive.

Figure 2C:
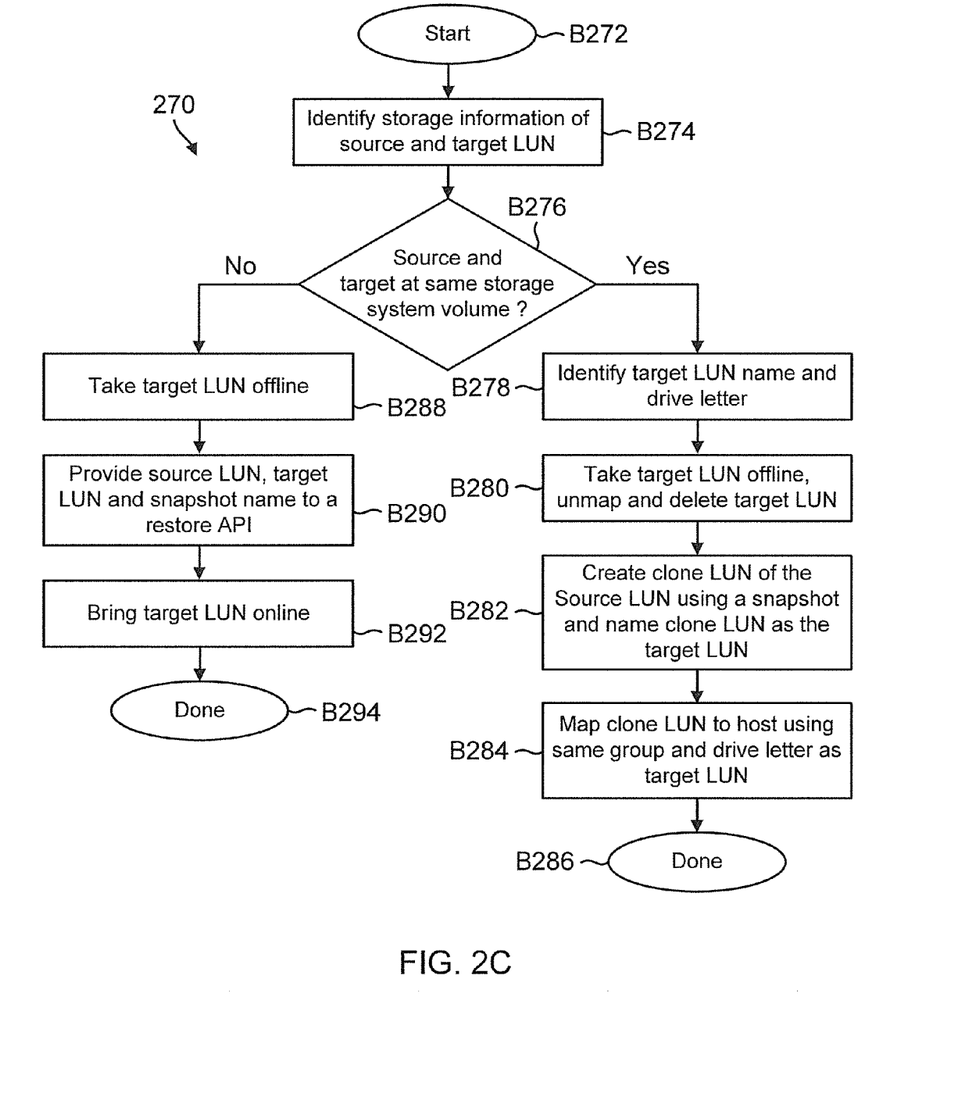
FIGS. 2C-2D shows process flow diagrams for restoring storage objects, according to one aspect.

FIG. 2C shows a process 270 for restoring a snapshot from a source drive to a target drive, according to one aspect. The process begins in block B272, when a request to restore a snapshot is received by SSIM 107. In block B274, SSIM identifies information regarding the source and target LUN. The information includes the LUN name (source and target), information regarding a storage system that manages the source LUN (for example, a storage system identifier), a storage system that manages the target LUN, when a different storage system manages the target LUN, a volume identifier associated with the source LUN and a volume identifier associated with the target LUN.

In block B276, SSIM 107 determines if the source and target LUN are in the same volume and/or managed by a same storage system. If yes, then in block B278, SSIM 107 obtains the target LUN name, information regarding an igroup and a drive letter for the target LUN. This information may be obtained from the storage operating system 109.

An igroup identifies one or more initiators that may issue input/output (I/O) request for reading and writing data. The initiators are associated with a LUN and are given specific permission to read, write and/or delete files stored at a LUN. The igroup information may be obtained from the storage operating system 109

In block B280, SSIM 107 takes the target LUN offline. SSIM 107A also un-maps the target LUN from the host system and the target drive. The un-mapping occurs at data structure 107A, where SSIM 107 stores all the LUN/Volume/storage system/drive mapping information. The target LUN is then deleted.

In block B282, SSIM 107 generates a clone of the source LUN by taking a snapshot. The clone is provided the same name as the deleted target LUN. Thereafter, in block B284, using the same drive and the igroup for the target LUN, the clone LUN is mapped to the client system. The process then ends in block 3286.

Figure 4:
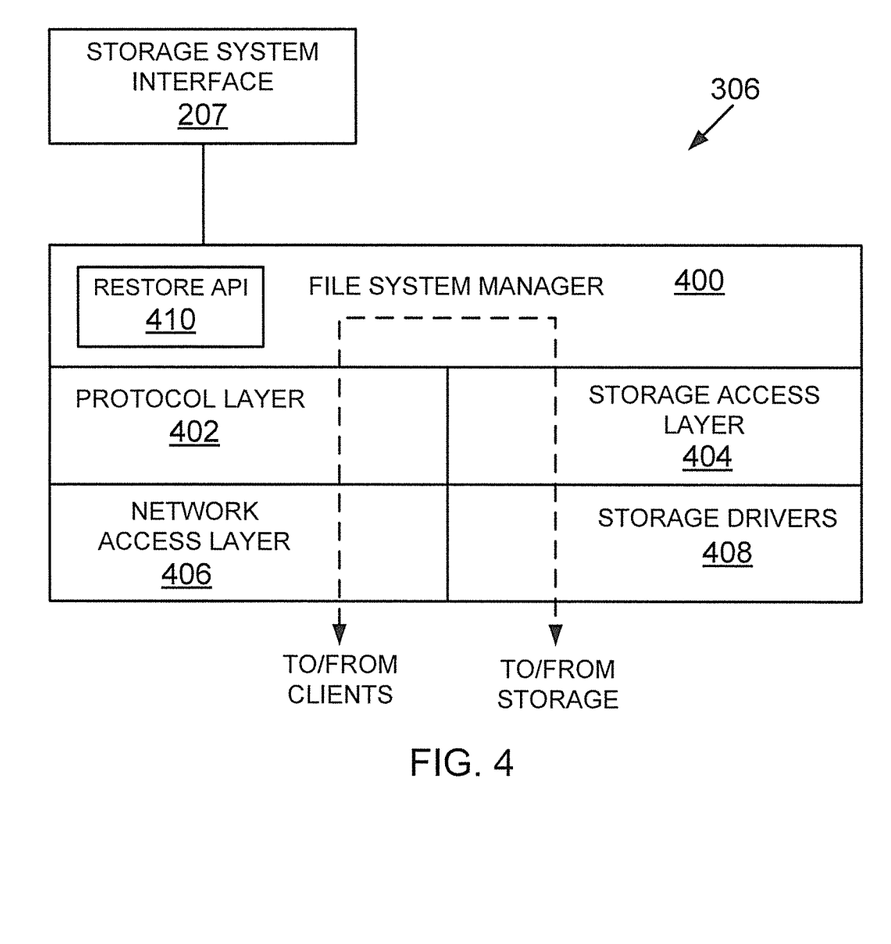
FIG. 4 shows an example of a storage operating system, used according to one aspect.

If the source and target LUN are not within the same storage system and/or volume, then in block B288, the target LUN is taken offline by SSIM 107. In block 3290, SSIM 107 provides source and target LUN information as well as a snapshot name and location information to a restore API (or restore module) 410 (FIG. 4). The restore API may be a part of or interfaces with the storage operating system 109. The restore API then restores the snapshot to the target drive. The restore API is provided by or interfaces with storage operating system 109. The target LUN is then brought on-line in block 3292 and the process ends in block B294.

Figure 2D:
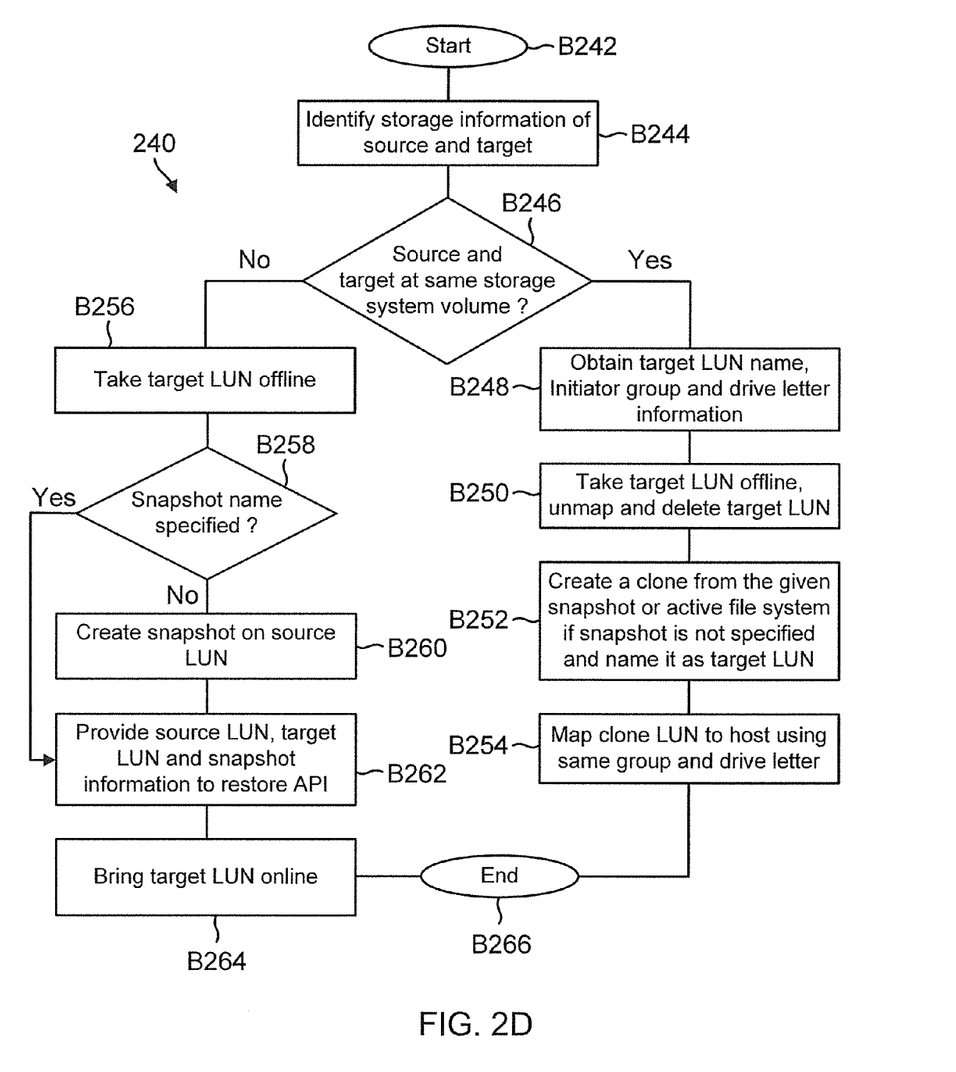

FIG. 2D shows a process 240 for restoring a LUN to the target drive 224 from the source drive 228 when a backup or snapshot name may not be specified, according to one aspect. The process begins in block B242. A LUN presented to application 105 has been replicated using SSIM 107. In one aspect, a replicated copy may be a point in time copy of the LUN or the storage volume where the LUN resides. A request to restore the LUN is received by SSIM 107 from the client. The request identifies the source and target drives.

In block B244, SSIM 107 evaluates the request and identifies the LUN name (source and target), a storage system that manages the source LUN, a storage system that manages the target LUN, a volume identifier associated with the source volume and a volume identifier for the target volume. It is noteworthy, as explained above that the source and target volume may be the same or different and different storage systems may manage the different storage volumes.

In block B246, SSIM 107 determines if the source and target LUNs are being managed by the same storage system and/or are located within the same storage volume.

If yes, then in block SSIM 107 obtains target LUN name, information regarding an igroup and a drive letter for the target LUN. This information may be obtained from the storage operating system 109.

In block B250, SSIM 107 takes the target LUN offline. SSIM 107 also un-maps the target LUN from the host system and the target drive. The un-mapping occurs at data structure 107A, where SSIM 107 stores all the LUN/Volume/storage system/drive mapping information. The target LUN is then deleted.

In block B252, SSIM 107 generates a clone of the source LUN from a given snapshot or the active file system. The clone is provided the same name as the deleted target LUN. Thereafter, in block B254, using the same drive and the igroup for the target LUN, the clone LUN is mapped to the client system. The process then ends in block B266.

If the target and source LUN are not a part of the same volume and/or storage system, then in block B256, the target LUN is taken offline by SSIM 107 i.e. made unavailable to clients. In block B258, SSIM 107 determines if a snapshot name was specified in the client request. If not, then a snapshot is taken in block B260 by SSIM 107. The source, target and snapshot information is then provided to the restore API of the storage operating system 109. The target LUN is then restored using the restore API. In block B264, the target LUN is brought online by the SSIM 107 and made available to clients and thereafter, the process ends.

Figure 2E:
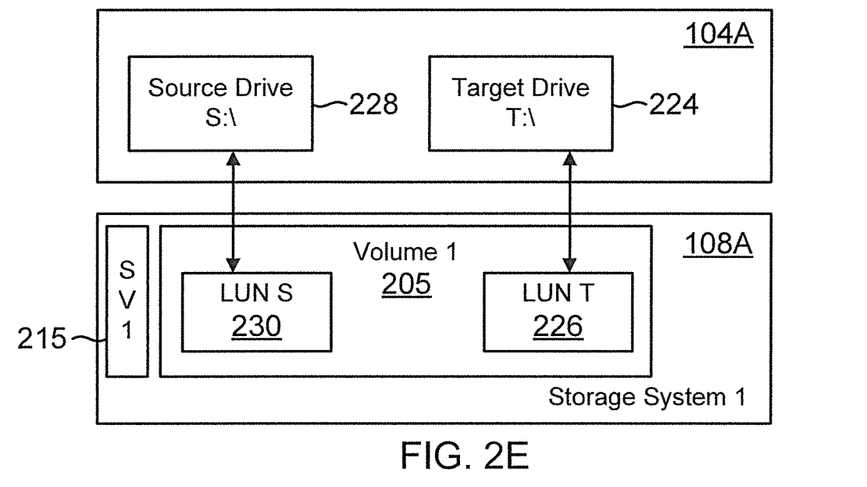
FIGS. 2E-2G show examples of restoring LUNs to different drives, according to the various aspects described herein.
Figure 2F:
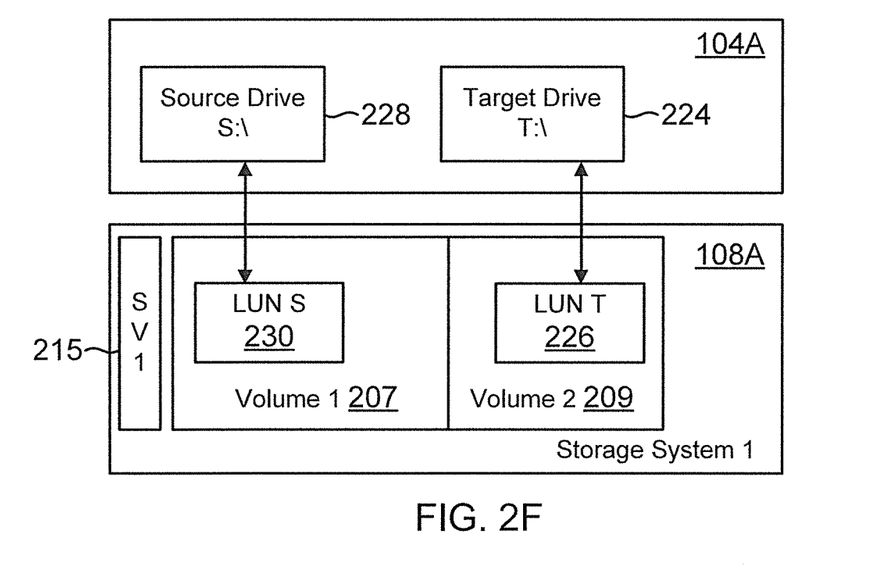
Figure 2G:
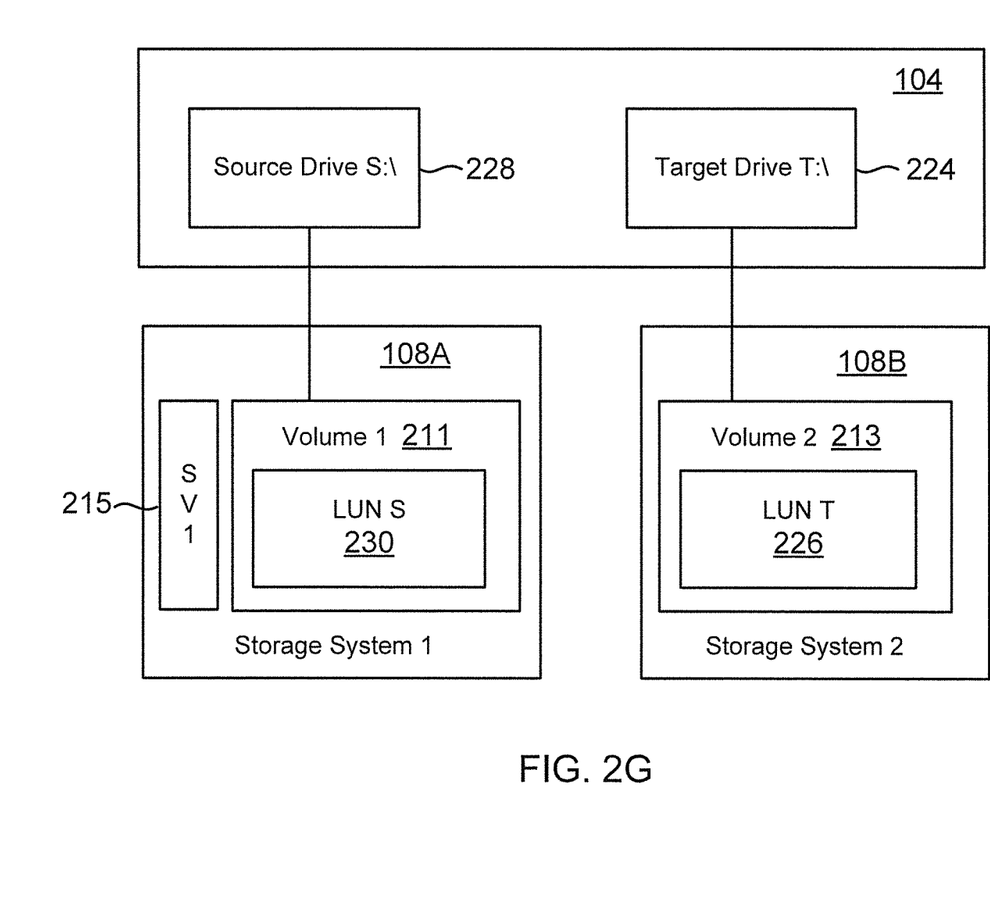

FIGS. 2E-2G show various examples of restoring a LUN and/or snapshot to different storage drives (i.e. 228/224), using the processes of FIGS. 2C and 2D. FIG. 2E shows that the source LUN 230 and target LUN 226 are part of a same storage volume 205 that is managed by storage system 108A. The snapshot of the source LUN is shown as 215.

FIG. 2F shows that the source LUN and target LUNs are a part of different storage volumes 207 and 209, respectively. The snapshot of the source volume is shown as 215.

FIG. 2G shows that the source and target LUNs are at different storage volumes 211 and 213. The different storage volumes are managed by different storage systems 108A and 108B. The snapshot of the source LUN is shown as 215.

The various aspects of the present disclosure provide flexibility to clients in restore operations. The client is not limited to any particular drive for restoring a LUN or snapshot. This is especially useful for a cloud based environment and virtual machine environment, where drives are mobile and can change frequently.

Figure 3:
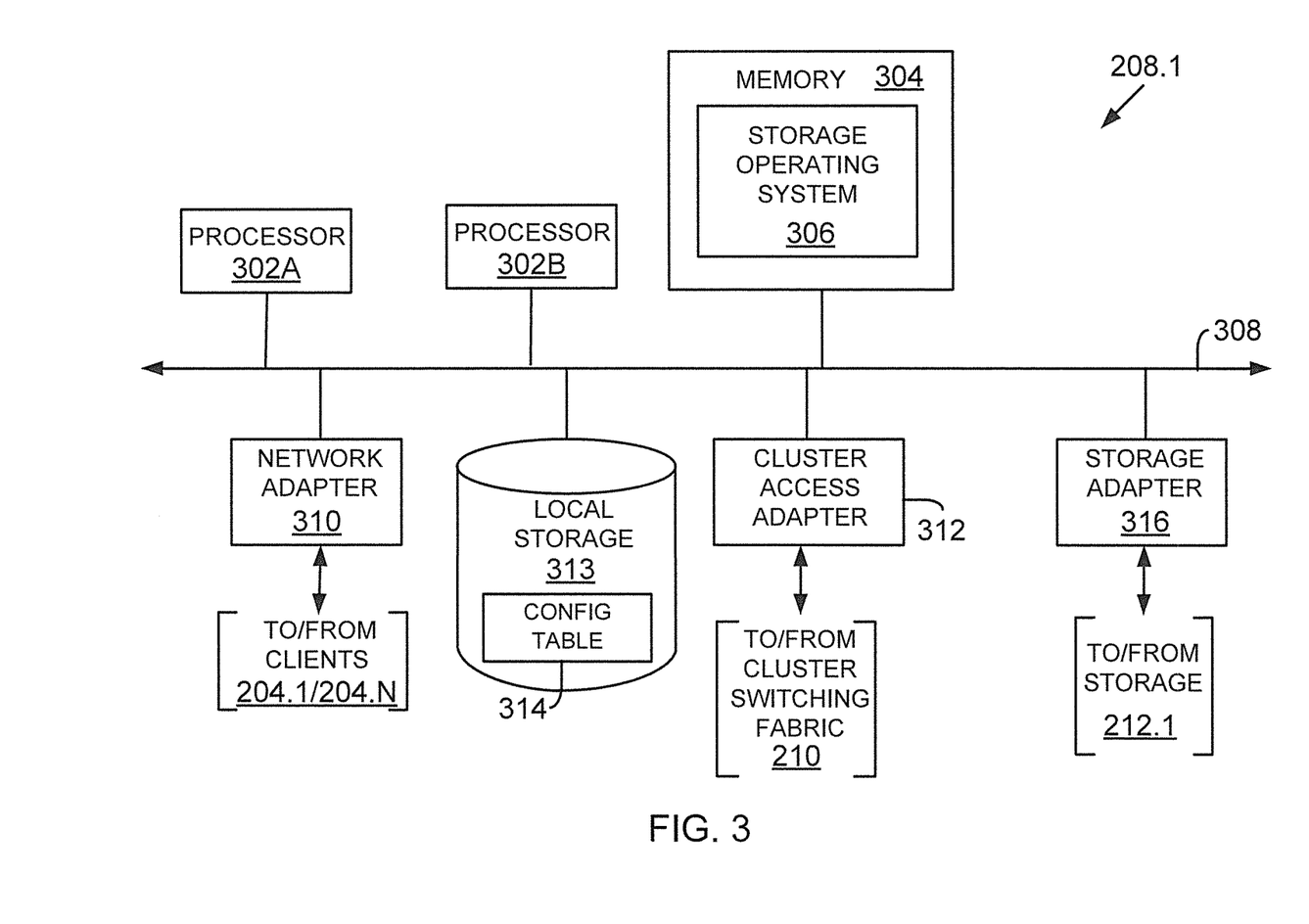
FIG. 3 shows an example of a node used in a cluster based storage system, according to one aspect.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. In one aspect, processors 302A-302B execute instructions for storing information regarding LUNs, snapshots and volumes. The information is provided to SSIM 107 for the restore operations as described above in detail.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration table 314.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 109, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Operating System:

FIG. 4 illustrates a generic example of storage operating system 306 (or 109, FIG. 1) executed by node 208.1, according to one aspect of the present disclosure. Storage operating system 306 maintains one or more data structures for storing information regarding storage volumes, storage system identifier information, LUNs, snapshots and snapshot locations. This information is provided to SSIM 107 and used for executing the process blocks of FIGS. 2C and 2D. Storage operating system includes or interfaces with restore API 410 that interfaces with SSIM 107 to restore a LUN to a different drive.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients 204.1/204.N and mass storage devices 212.1 are illustrated schematically as a path, which illustrates the flow of data through storage operating system 306.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 5:
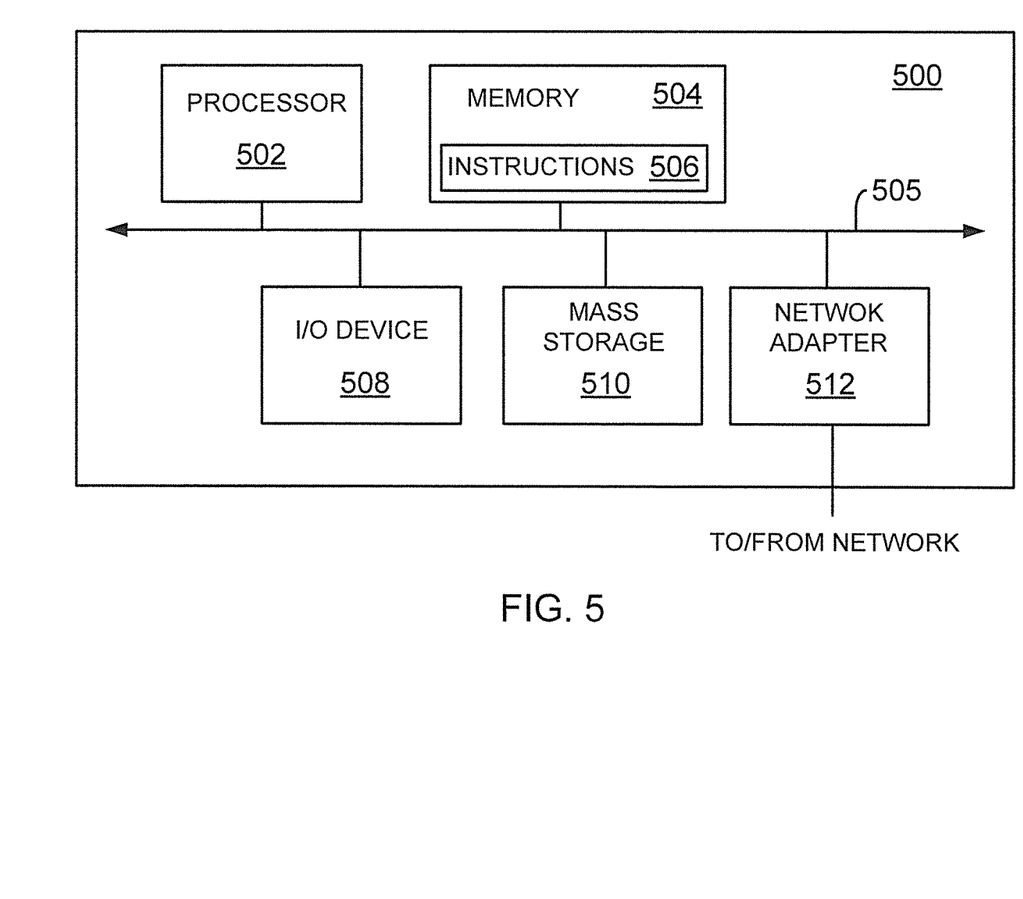
FIG. 5 shows an example of a computing system, used according to one aspect.

Processing System:

FIG. 5 is a high-level block diagram showing an example of the architecture of a processing system 500 that may be used according to one aspect. The processing system 500 can represent management console 120, client 104, 204 or storage system 108, for example. Note that certain standard and well-known components which are not germane to the present invention are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The techniques described above are applicable in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network (for example, the Internet or any other network type) used for providing computing as a service.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive aspects. The storage systems described above can be a part of the server layer for providing storage services.

Thus, a method and apparatus for restoring storage have been described. Note that references throughout this specification to "one aspect" or "an aspect" means that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the invention, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   determining if a source storage object and a target storage object are located within a same storage volume for a restore operation, where the source storage object is associated with a first drive letter and the target storage object is associated with a second drive letter; and the source storage object and the target storage object are logical structures presented to a computing device for storing client data using the first drive letter and the second driver letter;
   when the source storage object and the target storage object are located within the same storage volume:
   taking the target storage object offline;
   un-mapping the target storage object from the computing device that uses the target storage object to store data;
   deleting the target storage object;
   generating a clone of the source storage object by taking a point in time copy of the source storage object, when a name of any snapshot of the source storage object is not specified in a restore request for the restore operation;
   naming the generated clone of the source storage object with a same name as the deleted target storage object; and
   mapping the generated clone of the source storage object named as the target storage object to the second drive letter and to the computing device for completing the restore operation.

2. The method of claim 1, further comprising:
   when the source storage object and the target storage object are not located at the same storage volume:
   taking the target storage object offline;
   providing a point in time copy name for a point in time copy to a restore module, when the point in time copy name is specified in the restore request; and
   restoring the point in time copy with the point in time copy name to the second drive letter and bringing the target storage object online to complete the restore operation.

3. The method of claim 2, further comprising:
   taking a point in time copy of the source storage object for the restore operation, when the point in time copy name is not specified in the restore request; and
   restoring the taken point in time copy to the second drive letter and bringing the target storage object online to complete the restore operation.

4. The method of claim 1, further comprising:
   using an existing point in time copy for the restore operation, when the existing point in time copy is referenced in the restore request.

5. The method of claim 4, further comprising:
   mapping the generated clone of the source storage object named as the target storage object to a same initiator group identifier used for accessing the source storage object.

6. The method of claim 1, wherein the source storage object and the target storage object are logical unit numbers (LUNs) used for storing information at a storage device.

7. The method of claim 1, wherein a storage system interface module maintains a mapping data structure that is used for restoring the source storage object at the second drive.

8. A non-transitory, machine readable storage medium having stored thereon instructions for performing a method, comprising machine executable code which when executed by at least one machine, causes the machine to:
   determine if a source storage object and a target storage object are located within a same storage volume for a restore operation, where the source storage object is associated with a first drive letter and the target storage object is associated with a second drive letter; and the source storage object and the target storage object are logical structures presented to a computing device for storing client data using the first drive letter and the second driver letter;
   when the source storage object and the target storage object are located within the same storage volume:
   take the target storage object offline;
   un-map the target storage object from the computing device that uses the target storage object to store data;
   delete the target storage object;

generate a clone of the source storage object by taking a point in time copy of the source storage object, when a name of any snapshot of the source storage object is not specified in a restore request for the restore operation;

name the generated clone of the source storage object with a same name as the deleted target storage object; and map the generated clone of the source storage object named as the target storage object to the second drive letter and to the computing device for completing the restore operation.

9. The storage medium of claim 8, wherein the machine executable code further causes the machine to:

when the source storage object and the target storage object are not located at the same storage volume:

take the target storage object offline;

provide a point in time copy name for a point in time copy to a restore module, when the point in time copy name is specified in the restore request; and restore the point in time copy with the point in time copy name to the second drive letter and bringing the target storage object online to complete the restore operation.

10. The storage medium of claim 9, wherein the machine executable code further causes the machine to:

take a point in time copy of the source storage object for the restore operation, when the point in time copy name is not specified in the restore request; and restore the taken point in time copy to the second drive letter and bringing the target storage object online to complete the restore operation.

11. The storage medium of claim 8, wherein the machine executable code further causes the machine to:

use an existing point in time copy for the restore operation, when the existing point in time copy is referenced in the restore request.

12. The storage medium of claim 11, wherein the machine executable code further causes the machine to:

map the generated clone of the source storage object named as the target storage object to a same initiator group identifier used for accessing the source storage object.

13. The storage medium of claim 8, wherein the source storage object and the target storage object are logical unit numbers (LUNs) used for storing information at a storage device.

14. The storage medium of claim 8, wherein a storage system interface module maintains a mapping data structure that is used for restoring the source storage object at the second drive.

15. A system comprising:

a memory with machine readable medium comprising machine executable code having stored thereon instructions; and a processor module coupled to the memory, the processor module configured to execute the machine executable code to:

determine if a source storage object and a target storage object are located within a same storage volume for a restore operation, where the source storage object is associated with a first drive letter and the target storage object is associated with a second drive letter; and the source storage object and the target storage object are logical structures presented to a computing device for storing client data using the first drive letter and the second driver letter;

when the source storage object and the target storage object are located within the same storage volume:

take the target storage object offline;

un-map the target storage object from the computing device that uses the target storage object to store data;

delete the target storage object;

generate a clone of the source storage object by taking a point in time copy of the source storage object, when a name of any snapshot of the source storage object is not specified in a restore request for the restore operation;

name the generated clone of the source storage object with a same name as the deleted target storage object; and map the generated clone of the source storage object named as the target storage object to the second drive letter and to the computing device for completing the restore operation.

16. The system of claim 15, wherein the machine executable code further causes the machine to:

when the source storage object and the target storage object are not located at the same storage volume:

take the target storage object offline;

provide a point in time copy name for a point in time copy to a restore module, when the point in time copy name is specified in the restore request; and restore the point in time copy with the point in time copy name to the second drive letter and bringing the target storage object online to complete the restore operation.

17. The system of claim 16, wherein the machine executable code further causes the machine to:

take a point in time copy of the source storage object for the restore operation, when the point in time copy name is not specified in the restore request; and restore the taken point in time copy to the second drive letter and bringing the target storage object online to complete the restore operation.

18. The system of claim 15, wherein the machine executable code further causes the machine to:

use an existing point in time copy for the restore operation, when the existing point in time copy is referenced in the restore request.

19. The system of claim 18, wherein the machine executable code further causes the machine to:

map the generated clone of the source storage object named as the target storage object to a same initiator group identifier used for accessing the source storage object.

20. The system of claim 15, wherein the source storage object and the target storage object are logical unit numbers (LUNs) used for storing information at a storage device.

21. The system of claim 15, wherein a storage system interface module maintains a mapping data structure that is used for restoring the source storage object at the second drive.

* * * * *